United States Patent
Haruta

(10) Patent No.: US 11,403,060 B2
(45) Date of Patent: Aug. 2, 2022

(54) INFORMATION PROCESSING DEVICE AND NON-TRANSITORY COMPUTER READABLE MEDIUM FOR EXECUTING PRINTING SERVICE ACCORDING TO STATE OF UTTERANCE

(71) Applicant: FUJIFILM Business Innovation Corp., Tokyo (JP)

(72) Inventor: Takafumi Haruta, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 126 days.

(21) Appl. No.: 16/916,128

(22) Filed: Jun. 30, 2020

(65) Prior Publication Data

US 2021/0240430 A1 Aug. 5, 2021

(30) Foreign Application Priority Data

Jan. 31, 2020 (JP) .............................. JP2020-015709

(51) Int. Cl.
*G06F 3/16* (2006.01)
*G06F 3/12* (2006.01)

(52) U.S. Cl.
CPC ................ *G06F 3/16* (2013.01); *G06F 3/126* (2013.01); *G06F 3/1284* (2013.01)

(58) Field of Classification Search
CPC ........... G06F 3/16; G06F 3/126; G06F 3/1284
See application file for complete search history.

(56) References Cited

U.S. PATENT DOCUMENTS

| | | | |
|---|---|---|---|
| 10,514,888 B1* | 12/2019 | Rodgers | G06N 20/00 |
| 2014/0249817 A1* | 9/2014 | Hart | G10L 15/22 704/239 |
| 2016/0372110 A1* | 12/2016 | Waltermann | G10L 15/22 |
| 2020/0130197 A1* | 4/2020 | Roh | B25J 19/026 |
| 2020/0151526 A1* | 5/2020 | Natori | G06F 3/1263 |
| 2020/0160863 A1* | 5/2020 | Lee | G10L 13/00 |
| 2020/0175976 A1* | 6/2020 | Rakshit | G06F 16/487 |
| 2020/0177410 A1* | 6/2020 | Iyengar | H04L 12/2821 |
| 2020/0241820 A1* | 7/2020 | Uchino | G06F 3/1204 |
| 2020/0249883 A1* | 8/2020 | Nakata | G06F 3/1239 |
| 2021/0048980 A1* | 2/2021 | Webb | G06F 3/1206 |

FOREIGN PATENT DOCUMENTS

JP  2012-128440  7/2012

\* cited by examiner

*Primary Examiner* — Beau D Spratt
(74) *Attorney, Agent, or Firm* — JCIPRNET

(57) ABSTRACT

An information processing device is provided with a processor configured to receive, as an utterance, an instruction for executing a service, and cause the received service to be executed according to a setting determined using a state of the utterance.

18 Claims, 10 Drawing Sheets

FIG. 3

| SPEAKER | TIME | UTTERANCE STATE | | |
|---|---|---|---|---|
| | | PITCH | LOUDNESS | SPEED |
| A | 12/1/2019 14:01 | av1 | al1 | as1 |
| | 12/3/2019 8:10 | av2 | al2 | as2 |
| | ⋮ | ⋮ | ⋮ | ⋮ |
| B | 12/3/2019 8:20 | bv1 | bl1 | bs1 |
| | ⋮ | ⋮ | ⋮ | ⋮ |
| ⋮ | ⋮ | ⋮ | ⋮ | ⋮ |

FIG. 4

| SPEAKER | TIME | SCHEDULE |
|---|---|---|
| A | 12/3/2019 8:30 - 10:00 | MEETING |
| | 12/5/2019 9:00 - 17:00 | BUSINESS TRIP |
| | ⋮ | ⋮ |
| B | 12/3/2019 11:00 - 14:00 | HOSTING VISITOR |
| | ⋮ | ⋮ |
| ⋮ | ⋮ | ⋮ |

INFORMATION PROCESSING DEVICE AND NON-TRANSITORY COMPUTER READABLE MEDIUM FOR EXECUTING PRINTING SERVICE ACCORDING TO STATE OF UTTERANCE

CROSS-REFERENCE TO RELATED APPLICATIONS

This application is based on and claims priority under 35 USC 119 from Japanese Patent Application No. 2020-015709 filed Jan. 31, 2020.

BACKGROUND

(i) Technical Field

The present disclosure relates to an information processing device and a non-transitory computer readable medium.

(ii) Related Art

Japanese Unexamined Patent Application Publication No. 2012-128440 discloses a speech interactive device provided with a speech recognizer that recognizes the content of an utterance by a speaker and a response controller that uses speech synthesis to provide a speech response according to the recognition result. The speech interactive device is provided with a speaking speed detector that detects the speed of the utterance by the speaker, and the response controller changes a response time from the point in time at which the speech recognizer detects the end of the utterance by the speaker until the response speech starts to be provided according to the speaking speed detected by the speaking speed detector.

SUMMARY

In the related art, when a spoken utterance is used to instruct a control target device to execute a service, there is a problem in that it is burdensome for the speaker to utter the settings of the service.

Aspects of non-limiting embodiments of the present disclosure relate to reducing the burden of such an utterance compared to the case where the speaker utters the settings of a service when instructing a control target device to execute the service.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device provided with a processor configured to receive, as an utterance, an instruction for executing a service, and cause the received service to be executed according to a setting determined using a state of the utterance.

BRIEF DESCRIPTION OF THE DRAWINGS

Exemplary embodiments of the present disclosure will be described in detail based on the following figures, wherein:

FIG. 3 is a schematic diagram illustrating an example of a configuration of an utterance state information database according to an exemplary embodiment;

FIG. 4 is a schematic diagram illustrating an example of a configuration of a schedule information database according to an exemplary embodiment;

DETAILED DESCRIPTION

Hereinafter, exemplary embodiments for carrying out the present disclosure will be described in detail and with reference to the drawings. Note that the following describes a case of applying a personal computer as the information processing device. Also, although the following describes a case in which the information processing device and the control target device are configured separately, these devices may also be integrated into a single device.

First Exemplary Embodiment

Figure 1:
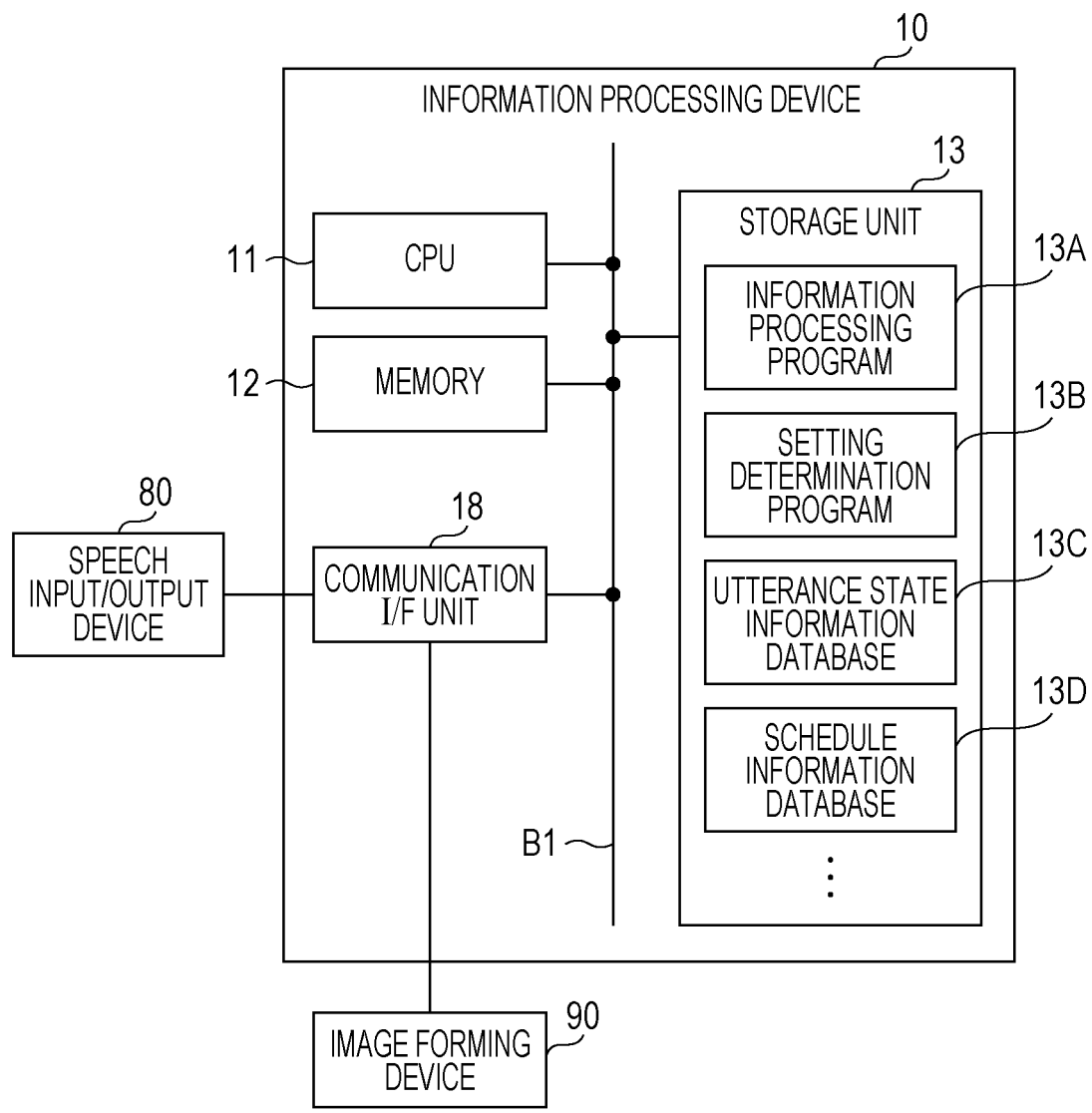
FIG. 1 is a block diagram illustrating an example of a hardware configuration of an information processing device according to first and second exemplary embodiments.

As illustrated in FIG. 1, an information processing device 10 according to the present exemplary embodiment is provided with a central processing unit (CPU) 11, memory 12 that acts as a temporary storage area, a non-volatile storage unit 13, and a communication interface (I/F) unit 18. The CPU 11, the memory 12, the storage unit 13, and the communication I/F unit 18 are interconnected through a bus B1.

The storage unit 13 is realized by a hard disk drive (HDD), a solid-state drive (SSD), flash memory, or the like. The storage unit 13 that acts as a storage medium stores an information processing program 13A and a setting determination program 13B. The CPU 11 loads the information processing program 13A and the setting determination program 13B from the storage unit 13 into the memory 12, and sequentially executes processes included in the information processing program 13A and the setting determination program 13B. The storage unit 13 also stores an utterance state information database 13C and a schedule information database 13D. Details about the utterance state information database 13C and the schedule information database 13D will be described later.

In the present exemplary embodiment, an image forming device is applied as the control target device, and a speech input/output device 80 and an image forming device 90 are connected to the communication I/F unit 18. Consequently, the CPU 11 is capable of transmitting and receiving various information with the speech input/output device 80 and the image forming device 90. Note that in the present exemplary embodiment, a smart speaker is applied as the speech input/output device 80, but it is also possible to apply another device capable of inputting outputting speech, such as a smartphone or a mobile information terminal device. Also, in the present exemplary embodiment, a digital multi-function device including functions such as a print function, an image reading function, and a facsimile function is applied as the image forming device 90, but obviously the image forming device 90 is not limited thereto.

Figure 2:
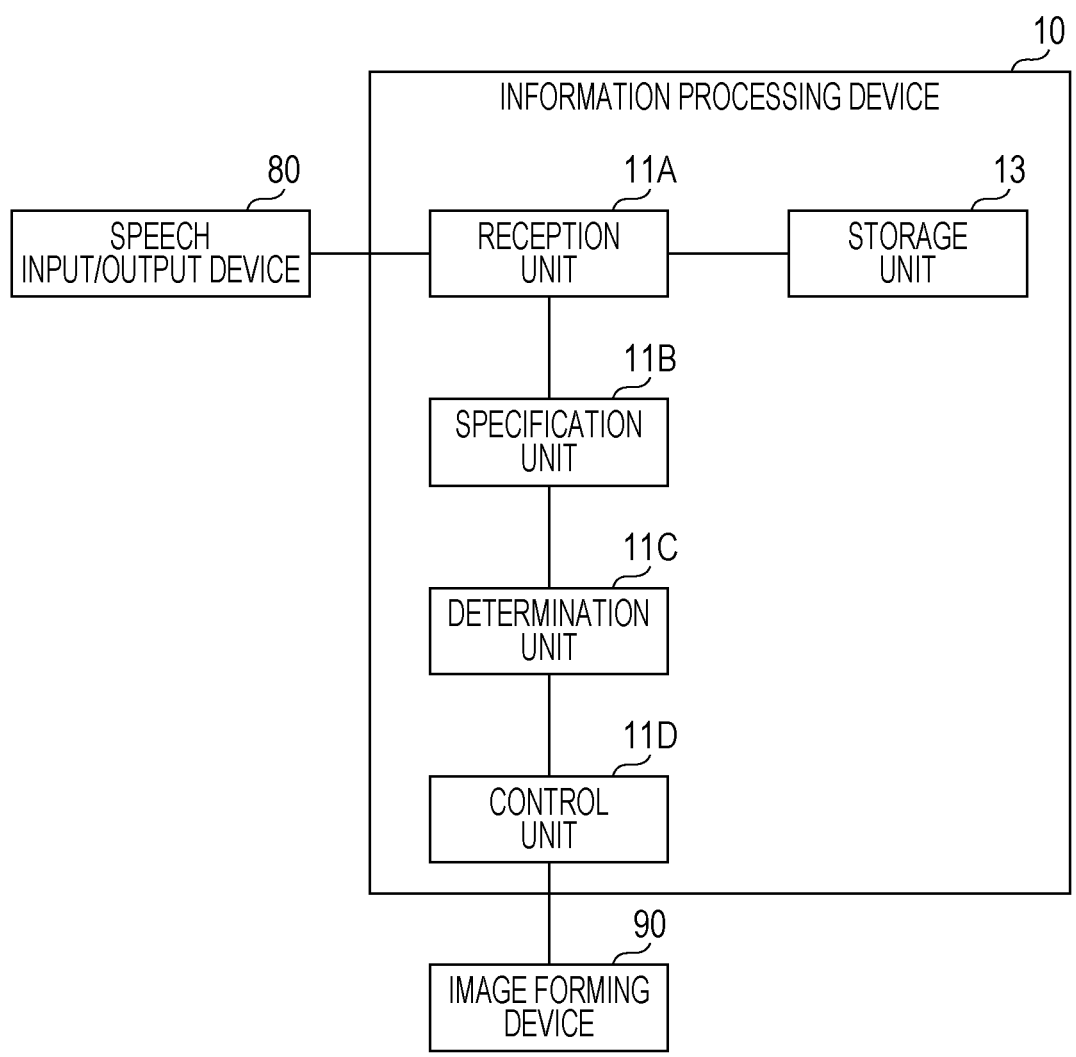
FIG. 2 is a block diagram illustrating an example of a functional configuration of the information processing device according to the first exemplary embodiment.

Next, a functional configuration of the information processing device 10 according to the present exemplary embodiment will be described. As illustrated in FIG. 2, the information processing device 10 includes a reception unit 11A, a specification unit 11B, a determination unit 11C, and a control unit 11D. The CPU 11 of the information processing device 10 functions as the reception unit 11A, the specification unit 11B, the determination unit 11C, and the control unit 11D by executing the information processing program 13A and the setting determination program 13B.

The reception unit 11A according to the present exemplary embodiment receives an instruction for executing a service using the image forming device 90, the instruction being received as an utterance through the speech input/output device 80. Note that the "service" referred to herein includes processes that are performed free of charge as well as paid processes. Also, in the present exemplary embodiment, a print service is applied as the service, but the configuration is not limited thereto, and another service such as an image reading service or a facsimile transmission service for example may also be applied.

Additionally, the specification unit 11B according to the present exemplary embodiment specifies the speaker who gives the instruction received by the reception unit 11A. Note that when an instruction for executing the service is received as an utterance by the reception unit 11A, the specification unit 11B according to the present exemplary embodiment specifies the speaker by applying an existing spoken content-dependent speaker recognition method of the related art, but is not limited to such a configuration. For example, a configuration may also be adopted such that the specification unit 11B specifies the speaker by applying technology such as a spoken content-independent speaker recognition method, or instead of authentication using voice, the specification unit 11B may specify the speaker according to information input via an input unit such as a touch panel provided on the image forming device 90.

Also, the determination unit 11C according to the present exemplary embodiment uses past utterances to determine the settings of the service. Note that in the present exemplary embodiment, the resolution of the printed image, the size of the printed sheet, and the number of document pages to print on a single printed sheet are applied as the settings to be determined, but the configuration is not limited thereto. For example, in addition to the above settings, other settings such as the speed of printing and whether or not to perform color printing may also be included among the settings to be determined, and configurations in which these settings are applied individually or in combinations of multiple settings are also possible. Additionally, the determination unit 11C according to the present exemplary embodiment determines the settings by using utterances received by the reception unit 11A in the past from the speaker giving the instruction, but is not limited to this configuration. For example, an utterance preregistered by a user or the like of the information processing device 10 may also be used to determine the settings.

Also, the control unit 11D according to the present exemplary embodiment additionally controls the presentation of the service received by the reception unit 11A and the determined content of the settings of the service. Note that in the present exemplary embodiment, a configuration is applied such that the presentation is controlled in the case where the volume of noise occurring together with the utterance is higher than a predetermined level, but the present exemplary embodiment is not limited to this configuration. For example, a configuration may be applied such that the presentation is controlled every time an instruction for executing a service is received by the reception unit 11A.

Also, the present exemplary embodiment adopts a configuration in which the service and the settings are presented by outputting speech through the speech input/output device 80, but the present exemplary embodiment is not limited thereto. For example, the service and the settings may also be displayed by a display unit such as a liquid crystal display provided in the image forming device 90.

Also, in the present exemplary embodiment, in the case where the volume of the noise is equal to or greater than the value set as the predetermined level, it is determined that the utterance performed together with the noise is difficult to recognize, and a value obtained by prior experiment using real equipment, computer simulation, or the like is applied, but the present exemplary embodiment is not limited thereto. For example, the value may be preset by the user or the like of the information processing device 10 according to properties such as the recognition accuracy of the service for which information processing is demanded or the purpose of the information processing device 10.

Also, the reception unit 11A additionally receives an utterance by the speaker who gave the instruction for executing the service, the utterance being given in response to the presentation of the service and the settings.

Also, the control unit 11D according to the present exemplary embodiment causes the image forming device 90 to execute the service received by the reception unit 11A according to settings determined by using the state of the utterance received by the reception unit 11A. Note that in the present exemplary embodiment, the pitch, loudness, and speed of the speech of the corresponding utterance are applied as states of the utterance, but the present exemplary embodiment is not limited thereto. For example, in addition to the above states, other states such as the presence or absence of an accent (such as Kanto dialect or Kansai dialect, for example) or the emotion of the utterance (such as happiness or sadness) may also be included, and configurations in which these states are applied individually or in combinations of multiple states are also possible. In addition, the higher the pitch of the speech in the utterance, the higher the resolution of the printed image is set, while the greater the loudness of the speech in the utterance, the larger the size of the printed sheet is set, and the faster the speed of the speech in the utterance, the greater number of original pages to be printed on a single printed sheet is set (in the present exemplary embodiment, 3-stage settings), but the configuration is not limited thereto. For example, combinations other than the above combinations of the state of the utterance and the settings may also be applied, such as increasing the speed of printing in the case where the utterance is in Kansai dialect.

Additionally, the control unit 11D according to the present exemplary embodiment causes the image forming device 90 to execute the service while also applying a setting determined using schedule information about the speaker who gave the instruction received by the reception unit 11A. Note that in the present exemplary embodiment, the number of document pages to print on a single printed sheet is applied as the setting determined using the schedule information, but the configuration is not limited thereto. For example, other settings such as the resolution of the printed image and the size of the printed sheet may also be applied as the target, and configurations in which these settings are applied individually or in combinations of multiple settings are also possible.

Also, in the case where the settings determined using the state of the utterance and the settings determined using the schedule information are different, the control unit 11D according to the present exemplary embodiment causes the image forming device 90 to execute the service according to the settings determined using the schedule information. Note that in the present exemplary embodiment, schedule information related to the service received by the reception unit 11A is applied as the above schedule information, but obviously the present exemplary embodiment is not limited thereto.

Next, the utterance state information database 13C according to the present exemplary embodiment will be described. As illustrated in FIG. 3, the utterance state information database 13C according to the present exemplary embodiment stores information about the speaker, the time, and the utterance state in association with each other.

The speaker is information indicating the speaker who gives the instruction for executing the service received by the reception unit 11A, while the time is information indicating the date and time at which the execution instruction is given by the corresponding speaker. Also, the utterance state is information indicating the state of the utterance when the execution instruction is given by the corresponding speaker.

Next, the schedule information database 13D according to the present exemplary embodiment will be described. As illustrated in FIG. 4, the schedule information database 13D according to the present exemplary embodiment stores information about the speaker, the time, and the schedule in association with each other.

The speaker is the same information as the speaker in the utterance state information database 13C, while the time is information indicating the date and time of a scheduled item on the schedule of the corresponding speaker, and the schedule is information indicating the name of the scheduled item to be performed at the corresponding time. The example illustrated in FIG. 4 indicates that, for example, a speaker A is scheduled to go on a business trip from 9:00 am to 5:00 pm on Dec. 5, 2019.

Figure 5:
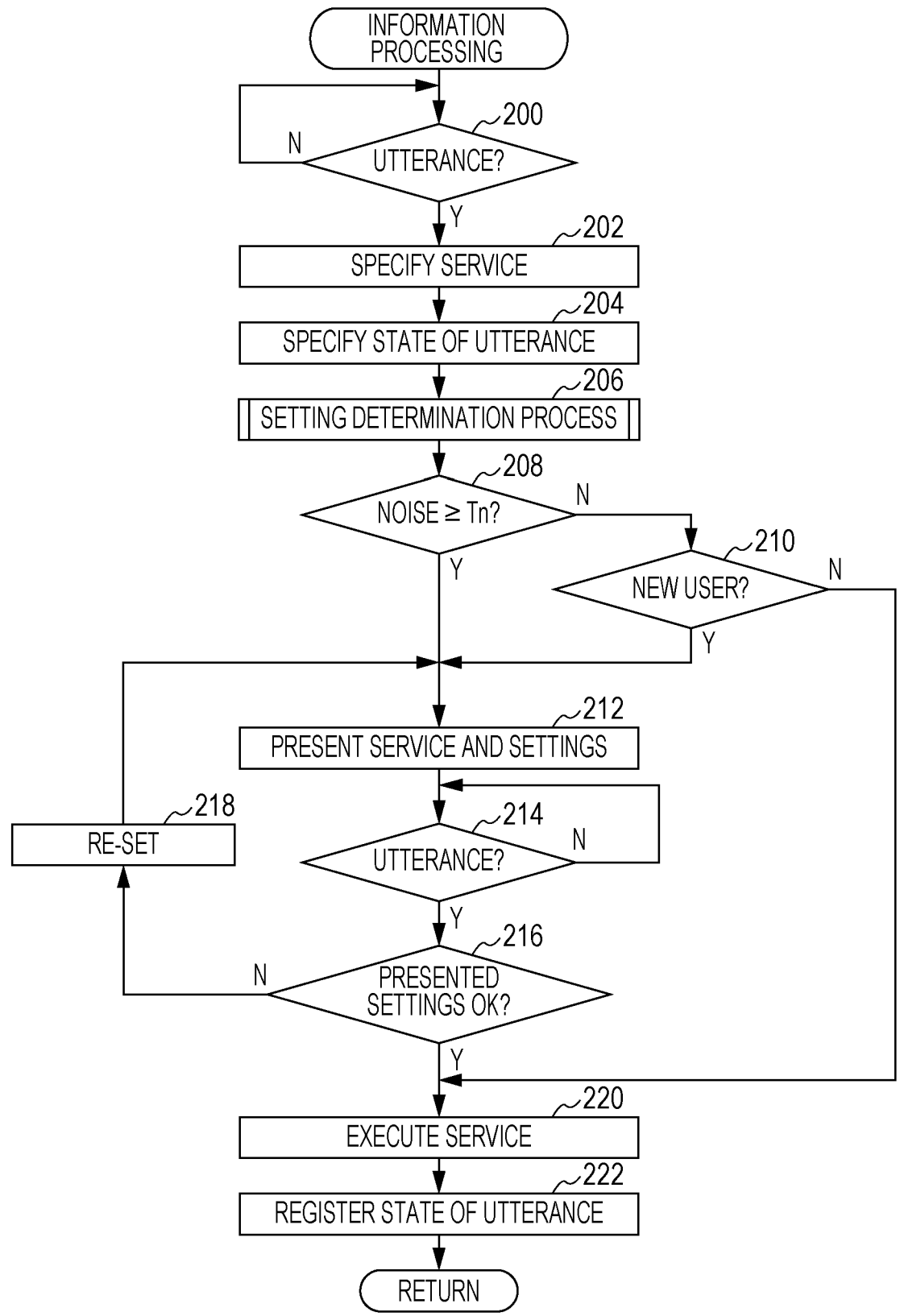
FIG. 5 is a flowchart illustrating an example of the flow of information processing according to an embodiment.

Next, FIG. 5 will be referenced to describe the actions of the information processing device 10 when executing information processing. The information processing illustrated in FIG. 5 is executed by having the CPU 11 of the information processing device 10 execute the information processing program 13A. Note that to avoid complication, a case in which the utterance state information database 13C and the schedule information database 13D are structured as illustrated in FIGS. 3 and 4 as an example is described here.

In step 200, the CPU 11 stands by until an instruction for executing a service is given through an utterance by any speaker. In step 202, the CPU 11 uses existing speech recognition technology of the related art to specify the service designated by the utterance received by the process of step 200, and in step 204, the CPU 11 specifies the state of the utterance. The present exemplary embodiment applies a configuration in which, as the method of specifying the state of the utterance, the pitch of the speech in the utterance is specified using the frequency of the speech, the loudness of the speech in the utterance is specified using the sound pressure of the speech, and the speed of the speech in the utterance is specified by dividing the number of characters in the speech specified by existing speech recognition technology of the related art by the utterance duration.

Figure 6:
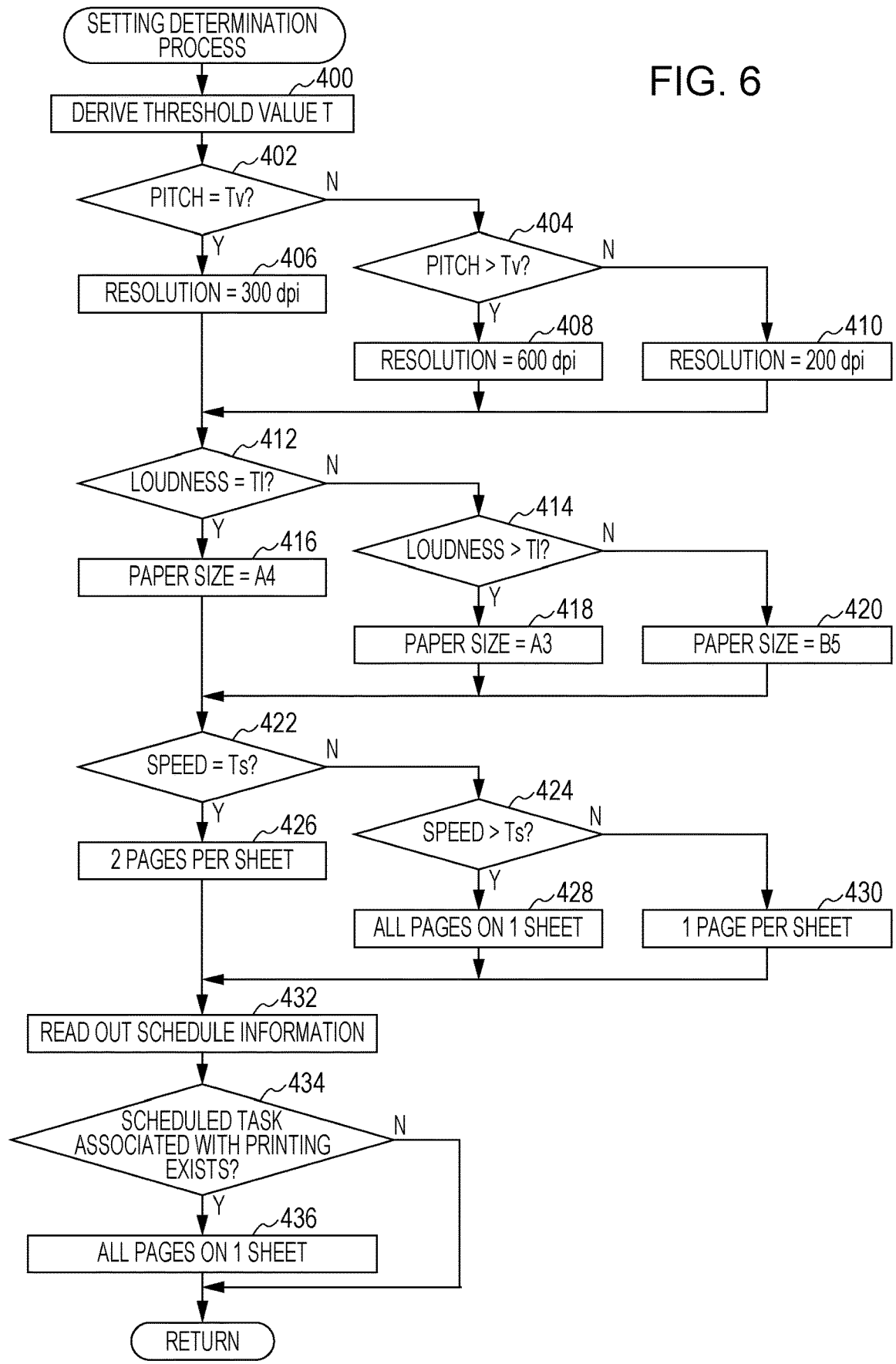
FIG. 6 is a flowchart illustrating an example of the flow of a setting determination process according to the first exemplary embodiment.

In the next step 206, the CPU 11 executes a setting determination process, which is a process for determining the settings of the service to be executed. The setting determination process illustrated in FIG. 6 is executed by having the CPU 11 of the information processing device 10 execute the setting determination program 13B. Hereinafter, FIG. 6 will be referenced to describe the setting determination process according to the present exemplary embodiment.

In step 400, the CPU 11 specifies the speaker who spoke the utterance received by the process of step 200 (hereinafter referred to as the "target speaker"), and reads out all values indicating the state of the utterance by the specified target speaker from the utterance state information database 13C. Additionally, the CPU 11 derives a threshold value T for each of predetermined time windows and each state by computing an average value for each predetermined time window and also for each state of pitch, loudness, and speed of the read-out values indicating the utterance state. Note that in the present exemplary embodiment, "am" and "pm" are applied as the time windows, but the time windows are not limited thereto. For example, the time windows may be set by the user or the like of the information processing device 10 according to properties such as the purpose of the information processing device 10.

In the following, the threshold value T related to "pitch" is designated the threshold value Tv, the threshold value T related to "loudness" is designated the threshold value T1, and the threshold value T related to "speed" is designated the threshold value Ts.

In step 402, the CPU 11 determines whether or not the pitch of the speech in the utterance specified by the process of step 204 is the same as the threshold value Tv corresponding to the time window of the current time (hereinafter also simply referred to as the "threshold value Tv"), and in the case of a positive determination, the flow proceeds to step 406, the CPU 11 sets the resolution of the printed image to 300 dpi, and the flow proceeds to step 412 described later. On the other hand, in the case of a negative determination in step 402, the flow proceeds to step 404, the CPU 11 determines whether or not the pitch of the speech in the utterance specified by the process of step 204 is greater than the threshold value Tv, and in the case of a positive determination, the flow proceeds to step 408, the CPU 11 sets the resolution of the printed image to 600 dpi, and the flow proceeds to step 412 described later. On the other hand, in the case of a negative determination in step 404, the pitch of the speech in the specified utterance is treated as being less than the threshold value Tv, the flow proceeds to step 410, the CPU 11 sets the resolution of the printed image to 200 dpi, and the flow proceeds to step 412.

In step 412, the CPU 11 determines whether or not the loudness of the speech in the utterance specified by the process of step 204 is the same as the threshold value T1 corresponding to the time window of the current time (hereinafter also simply referred to as the "threshold value T1"), and in the case of a positive determination, the flow proceeds to step 416, the CPU 11 sets the size of the printed sheet to A4, and the flow proceeds to step 422 described later. On the other hand, in the case of a negative determination in step 412, the flow proceeds to step 414, the CPU 11 determines whether or not the loudness of the speech in the utterance specified by the process of step 204 is greater than the threshold value T1, and in the case of a positive determination, the flow proceeds to step 418, the CPU 11 sets the size of the printed sheet to A3, and the flow proceeds to step 422 described later. On the other hand, in the case of a negative determination in step 414, the loudness of the speech in the specified utterance is treated as being less than the threshold value T1, the flow proceeds to step 420, the CPU 11 sets the size of the printed sheet to B5, and the flow proceeds to step 422.

For example, in the case where the speaker utters "Copy." in a relatively loud voice, and the loudness of the speech in the utterance is greater than the threshold value T1, the size of the printed sheet is set to A3. On the other hand, in the case where the speaker utters "Copy." in a relatively quiet voice, and the loudness of the speech in the utterance is less than the threshold value T1, the size of the printed sheet is set to B5.

In step 422, the CPU 11 determines whether or not the speed of the speech in the utterance specified by the process of step 204 is the same as the threshold value Ts corresponding to the time window of the current time (hereinafter also simply referred to as the "threshold value Ts"), and in the case of a positive determination, the flow proceeds to step 426, the CPU 11 sets a setting that prints two document pages together on one printed sheet, and the flow proceeds to step 432 described later. On the other hand, in the case of a negative determination in step 422, the flow proceeds to step 424, the CPU 11 determines whether or not the speed of the speech in the utterance specified by the process of step 204 is greater than the threshold value Ts, and in the case of a positive determination, the flow proceeds to step 428, the CPU 11 sets a setting that prints all document pages together on one printed sheet, and the flow proceeds to step 432 described later. On the other hand, in the case of a negative determination in step 424, the speed of the speech in the specified utterance is treated as being less than the threshold value Ts, the flow proceeds to step 430, the CPU 11 sets a setting that prints out a number of printed sheets equal to the number of document pages, and the flow proceeds to step 432.

Note that all of these specific setting values for the printing service are obviously examples. The setting values may also be changed by the user or the like of the information processing device 10 within the settable range of the image forming device 90.

In step 432, the CPU 11 reads out all information indicating the times and schedule of the target speaker from the schedule information database 13D. In step 434, the CPU 11 determines whether or not the information read out from the schedule information database 13D contains a scheduled item to be performed by the target speaker at the current point in time and also associated with printing by the image forming device 90 (such as a meeting, or hosting a visitor, for example). In the case of a negative determination, the setting determination process ends, whereas in the case of a positive determination, the flow proceeds to step 436, the CPU 11 sets a setting that prints all document pages on a single printed sheet, and the setting determination process ends. When the setting determination process ends, the flow proceeds to step 208 of the information processing (see FIG. 5).

In step 208, the CPU 11 determines whether or not the volume of noise occurring together with the instruction for executing the service given by the speaker is equal to or greater than a predetermined threshold value Tn. In the case of a positive determination, the flow proceeds to step 212 described later, whereas in the case of a negative determination, the flow proceeds to step 210.

In step 210, the CPU 11 determines whether or not the target speaker is executing the information processing for the first time. In the case of a negative determination, the flow proceeds to step 220 described later, whereas in the case of a positive determination, the flow proceeds to step 212. In step 212, the CPU 11 presents the specified service and the settings determined by the setting determination process by outputting speech through the speech input/output device 80, and the flow proceeds to step 214. At this point, the target speaker makes an utterance indicating whether or not to execute the specified service according to the presented content. Also, in the case where the target speaker rejects the execution of the indicated service according to the presented content, the target speaker utters a service and the content of the settings again. Accordingly, in step 214, the CPU 11 stands by until the target speaker uses the speech input/output device 80 to input an utterance corresponding to the service and the settings presented in step 212.

In step 216, the CPU 11 uses existing speech recognition technology of the related art to specify the content of the utterance received by the process of step 214 and determines whether or not to execute the service according to the presented content. In the case of a negative determination, the flow proceeds to step 218, the CPU 11 sets the specified service and settings again, and the flow returns to step 212. On the other hand, in the case of a positive determination in step 216, the flow proceeds to step 220, and the CPU 11 causes the image forming device 90 to execute the service according to the settings determined by the above process. In step 222, the CPU 11 registers all values indicating the state of the utterance by the target speaker specified by the process of step 204 in the utterance state information database 13C together with information indicating the current date and time, and the information processing ends.

Note that the present exemplary embodiment describes a configuration in which, in the case where the settings determined using the state of the utterance and the settings determined using the schedule information are different from each other, the CPU 11 causes the image forming device 90 to execute the service according to the settings determined using the schedule information, but may also be configured to additionally receive a selection of which of these settings to use. In this case, in the setting determination process illustrated in FIG. 6, a configuration that executes either the processes from step 422 to step 430 or the processes from step 432 to step 436 according to the selection result may be used, for example.

Second Exemplary Embodiment

The first exemplary embodiment above describes a configuration that uses threshold values to determine settings according to the state of a received utterance, but a second exemplary embodiment describes a configuration example for a case that determines settings without using threshold values. Note that the hardware configuration of an information processing device according to the second exemplary embodiment is the same as the configuration according to the first exemplary embodiment (see FIG. 1), and therefore a description is omitted here.

Figure 7:
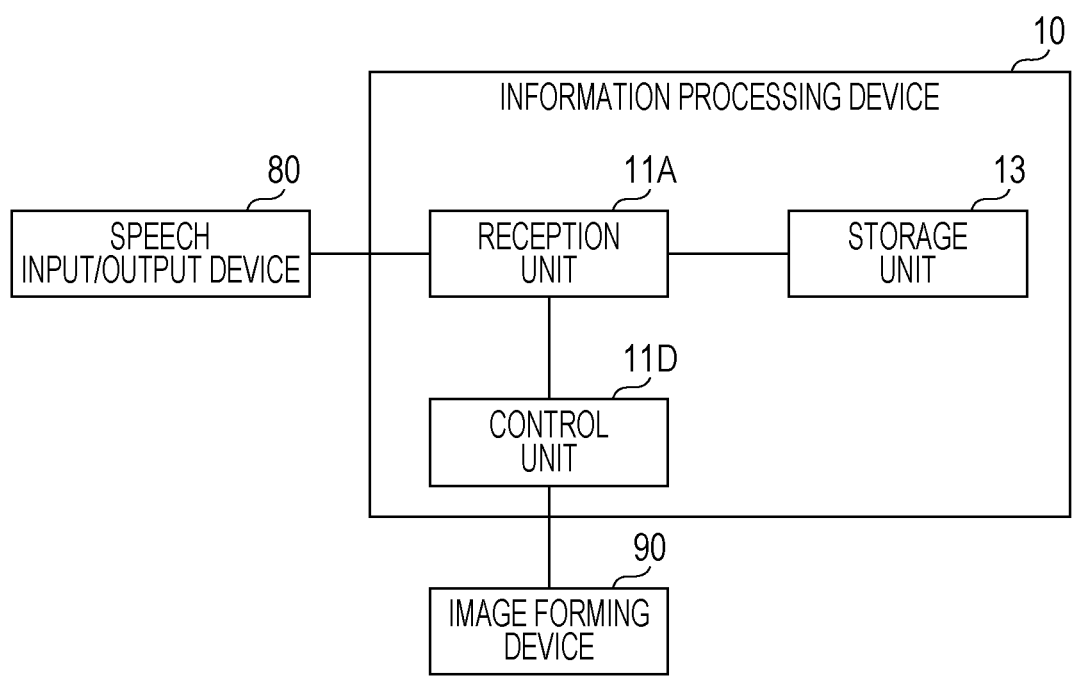
FIG. 7 is a block diagram illustrating an example of a functional configuration of the information processing device according to the second exemplary embodiment.

First, FIG. 7 will be referenced to describe a functional configuration of the information processing device 10 according to the second exemplary embodiment. Note that elements in FIG. 7 which are similar to FIG. 2 are denoted with the same signs as FIG. 2. As illustrated in FIG. 7, the second exemplary embodiment differs from the first exemplary embodiment above only in that the information processing device 10 does not include the specification unit 11B and the determination unit 11C.

Figure 8:
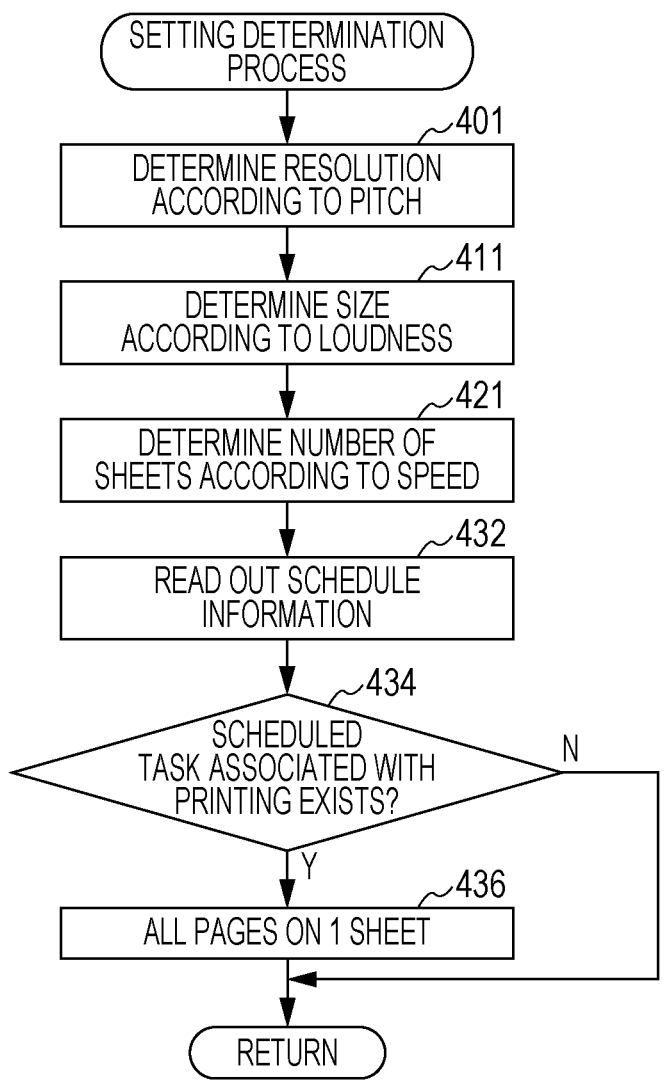
FIG. 8 is a flowchart illustrating an example of the flow of a setting determination process according to the second exemplary embodiment.

Next, FIG. 8 will be referenced to describe the actions of the information processing device 10 when executing the setting determination process as the actions of the information processing device 10 according to the second exemplary embodiment. Note that because the information processing illustrated in FIG. 5 is similar to the first exemplary embodiment except for the setting determination process, a description is omitted here. Also, steps that execute processes in the setting determination process illustrated in FIG. 8 which are the same as the setting determination process illustrated in FIG. 6 are denoted with the same step numbers of FIG. 6, and a description is omitted here.

The setting determination process illustrated in FIG. 8 differs from the setting determination process illustrated in FIG. 6 only in that the processes from step 401 to step 421 are applied instead of the processes from step 400 to step 430.

In other words, in step 401 of FIG. 8, the CPU 11 sets a correspondingly higher resolution of the printed image with respect to a higher pitch of the speech in the utterance specified by the process of step 204 in FIG. 5. The second exemplary embodiment applies a configuration that sets the resolution of the printed image by using a predetermined lookup table in which the pitch of the speech in an utterance is treated as input information and the resolution of the printed image is treated as output information, but a configuration that sets the resolution of the printed image according to a formula or the like that accepts input information similar to the lookup table may also be applied.

In step 411, the CPU 11 sets a correspondingly larger size of the printed sheet with respect to a greater loudness of the speech in the utterance specified by the process of step 204 in FIG. 5. The second exemplary embodiment applies a configuration that sets the size of the printed sheet by using a predetermined lookup table in which the loudness of the speech in an utterance is treated as input information and the size of the printed sheet is treated as output information, but a configuration that sets the size of the printed sheet according to a formula or the like that accepts input information similar to the lookup table may also be applied.

In step 421, the CPU 11 sets a correspondingly higher number of document pages to print on a single printed sheet with respect to a faster speed of the speech in the utterance specified by the process of step 204 in FIG. 5. The second exemplary embodiment applies a configuration that sets the number of document pages to print per printed sheet by using a predetermined lookup table in which the speed of the speech in an utterance is treated as input information and the number of document pages to print per printed sheet is treated as output information, but a configuration that sets the number of document pages to print per printed sheet according to a formula or the like that accepts input information similar to the lookup table may also be applied.

Note that with regard to a configuration example for a case of causing a control target device to execute a received service with a correspondingly larger setting value for louder speech in an utterance, the second exemplary embodiment describes a configuration example for a case of applying the image forming device 90 as the control target device, but is not limited to this configuration. For example, with regard to a configuration example for the case of performing such control, a case of applying a music playback device as the control target device may be configured as follows.

In other words, in this case, if "Play music" is uttered in a relatively loud voice via the speech input/output device 80 (here, a smart speaker), a service of playing music is executed, and the speech input/output device 80 is controlled to play the music at a volume higher than a normal value (such as an initial volume set in the speech input/output device 80 or a terminal device or the like linked to the speech input/output device 80, or the volume of sound that has been played so far, for example) as a setting value. On the other hand, in the case where "Play music" is uttered in a relatively quiet voice via the speech input/output device 80, the service of playing music is executed, and the speech input/output device 80 is controlled to play the music at a volume lower than the normal volume as a setting value.

Furthermore, in this configuration example, if "Raise the volume" is uttered in a relatively loud voice via the speech input/output device 80 after the music has begun playing or the like, a service of raising the volume higher than before is executed, and the speech input/output device 80 is controlled to make the volume step larger than normal as a setting value. In this case, if the volume is normally raised by one step at a time, for example, the volume may be raised by more steps at a time than normal (for example, 2 two steps at a time). On the other hand, if "Raise the volume" is uttered in a relatively quiet voice via the speech input/output device 80, a service of raising the volume higher than before is executed, and the speech input/output device 80 is controlled to make the volume step smaller than normal as a setting value. In this case, if the volume is normally raised by one step at a time, for example, the volume may be raised by fewer steps at a time than normal (for example, 0.5 steps at a time).

Third Exemplary Embodiment

The first and second exemplary embodiments describe configurations that apply the image forming device 90 as the control target device, but a third exemplary embodiment describes a configuration example that applies a cleaning robot 100 as the control target device.

Figure 9:
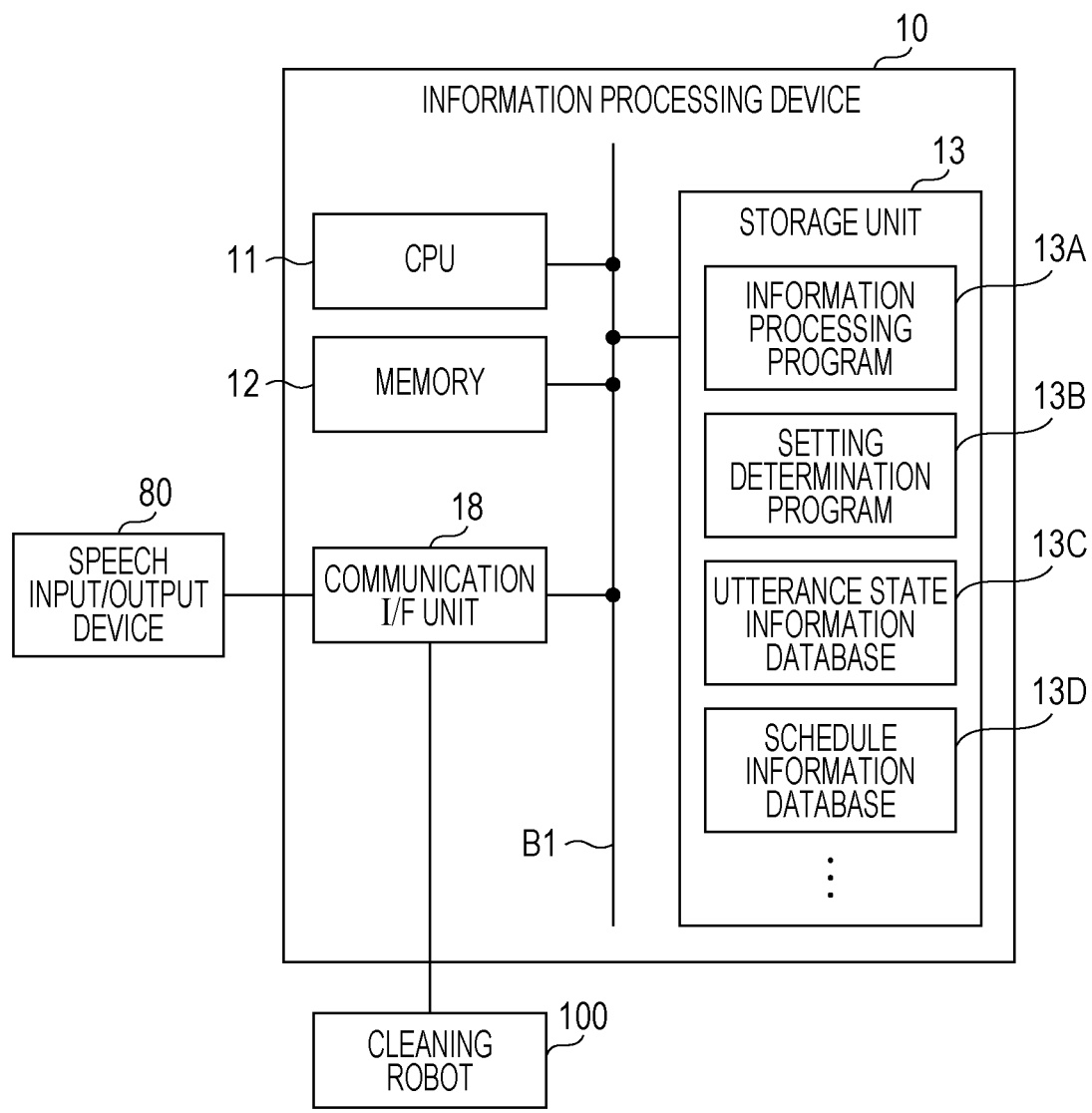
FIG. 9 is a block diagram illustrating an example of a hardware configuration of an information processing device according to a third exemplary embodiment.

First, a hardware configuration of an image processing device according to the third exemplary embodiment will be described with reference to FIG. 9. Note that elements in FIG. 9 which are similar to FIG. 1 are denoted with the same signs as FIG. 1. As illustrated in FIG. 9, the third exemplary embodiment differs from the first and second exemplary embodiments above in that the cleaning robot 100 is connected to the communication I/F unit 18. Note that in the third exemplary embodiment, a self-propelled cleaner having functions such as a self-propulsion function and a cleaning function is applied as the cleaning robot 100, but obviously the self-propelled cleaner is not limited thereto.

Figure 10:
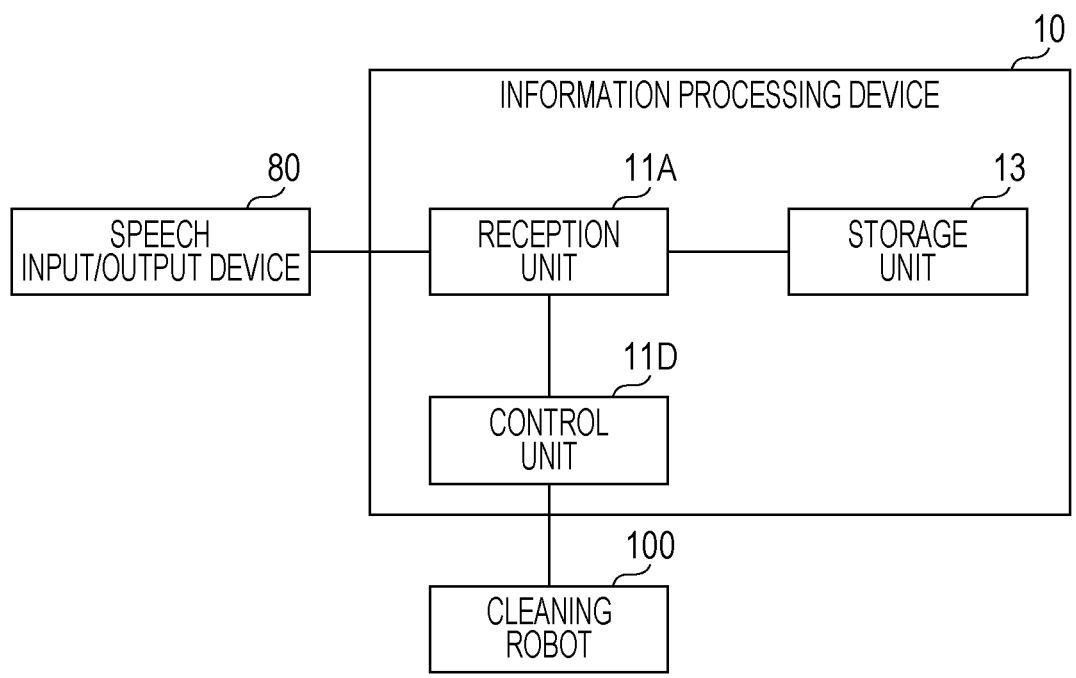
FIG. 10 is a block diagram illustrating an example of a functional configuration of the information processing device according to the third exemplary embodiment.

Next, FIG. 10 will be referenced to describe a functional configuration of the information processing device 10 according to the third exemplary embodiment. Note that elements in FIG. 10 which are similar to FIG. 2 are denoted with the same signs as FIG. 2. As illustrated in FIG. 10, the third exemplary embodiment differs from the second exemplary embodiment above only in that the cleaning robot 100 is connected to the control unit 11D.

The reception unit 11A according to the third exemplary embodiment differs from the first and second exemplary embodiments above only in receiving a service using the cleaning robot 100 through an utterance. Note that in the third exemplary embodiment, a vacuum cleaning service is applied as the service, but the service is not limited to thereto, and a service such as a wiping service may also be applied.

Also, the control unit 11D according to the third exemplary embodiment differs from the first and second exemplary embodiments above in causing the cleaning robot 100 to execute the service received by the reception unit 11A according to settings determined using the state of the utterance received by the reception unit 11A. Note that in the third exemplary embodiment, the number of times to vacuum-clean the same spot and the number of rooms in which to perform vacuum cleaning are applied as the settings to be determined, but the settings to be determined are not limited thereto. For example, in addition to the above settings, other settings such as the strength of the vacuum force of the cleaning robot 100 and the time until vacuum cleaning is started may also be included among the settings to be determined, and configurations in which these settings are applied individually or in combinations of multiple settings are also possible.

Also, the control unit 11D according to the third exemplary embodiment differs from the first and second exemplary embodiments above in using the loudness of the speech in the utterance received by the reception unit 11A to determine the number of times to vacuum-clean the same spot and using the speed of the speech to determine the number of rooms in which to perform vacuum cleaning. Note that combinations other than the above combinations of the state of the utterance and the settings may also be applied.

Also, the control unit 11D according to the third exemplary embodiment differs from the first and second exemplary embodiments above in causing the cleaning robot 100 to execute the service received by the reception unit 11A according to settings determined using the schedule information of the speaker who gave the instruction received by the reception unit 11A. Note that the third exemplary embodiment applies the number of times to vacuum-clean the same spot as the setting to be determined using the schedule information, but the setting to be determined is not limited thereto. For example, the number of rooms in which to perform vacuum cleaning may also be applied, and configurations in which these settings are applied individually or in combinations of multiple settings are also possible.

Figure 11:
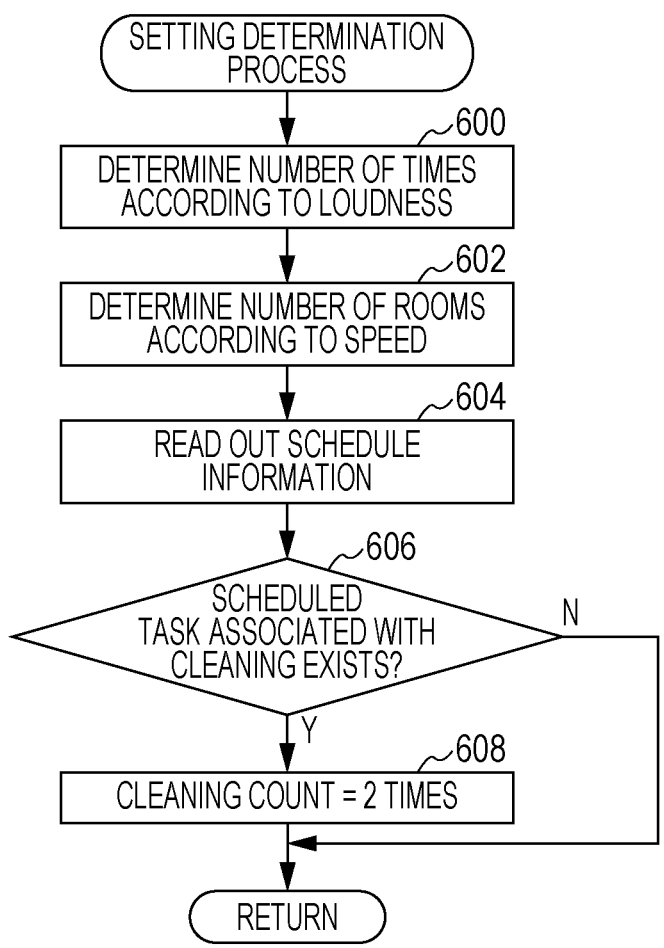
FIG. 11 is a flowchart illustrating an example of the flow of a setting determination process according to the third exemplary embodiment.

Next, FIG. 11 will be referenced to describe the actions of the information processing device 10 when executing the setting determination process as the actions of the information processing device 10 according to the third exemplary embodiment. Note that because the information processing illustrated in FIG. 5 is similar to the first exemplary embodiment except for the setting determination process, a description is omitted here.

In step 600, the CPU 11 sets a correspondingly higher number of times for the cleaning robot 100 to vacuum-clean the same spot with respect to a greater loudness of the speech in the utterance specified by the process of step 204 in FIG. 5. Note that in the third exemplary embodiment applies a configuration that sets the number of times to vacuum-clean by using a predetermined lookup table in which the loudness of the speech in an utterance is treated as input information and the number of times to vacuum-clean is treated as output information, but a configuration that sets the number of times to vacuum-clean according to a formula or the like that accepts input information similar to the lookup table may also be applied.

In step 602, the CPU 11 sets a correspondingly higher number of rooms in which the cleaning robot 100 is to perform vacuum cleaning with respect to a faster speed of the speech in the utterance specified by the process in step 204 of FIG. 5. Note that the third exemplary embodiment applies a configuration that sets the number of rooms by using a predetermined lookup table in which the speed of the speech in an utterance is treated as input information and the number of rooms is treated as output information, but a configuration that sets the number of rooms according to a formula or the like that accepts input information similar to the lookup table may also be applied.

In step 604, the CPU 11 reads out all information indicating the times and schedule of the target speaker from the schedule information database 13D. In step 606, the CPU 11 determines whether or not the information read out from the schedule information database 13D contains a scheduled item to be performed by the target speaker at the current point in time and also associated with vacuum cleaning by the cleaning robot 100 (such as hosting a visitor, for example). In the case of a negative determination, the setting determination process ends, whereas in the case of a positive determination, the flow proceeds to step 608, the CPU 11 sets the number of times for the cleaning robot 100 to vacuum-clean the same spot to 2, and the setting determination process ends. When the setting determination process ends, the flow proceeds to step 208 of the information processing (see FIG. 5).

Note that all of these specific setting values for the vacuum cleaning service are obviously examples. The setting values may also be changed by the user or the like of the information processing device 10 within the settable range of the cleaning robot 100.

The foregoing describes exemplary embodiments, but the technical scope of the present disclosure is not limited to the scope described in the foregoing exemplary embodiments. Various modifications or alterations may be made to the foregoing exemplary embodiments within a scope that does not depart from the gist of the present disclosure, and any embodiments obtained by such modifications or alterations are also included in the technical scope of the present disclosure.

Furthermore, the foregoing exemplary embodiments do not limit the present disclosure as stated in the claims, and not all combinations of features described in the exemplary embodiments are necessarily required as means for addressing the issues of the present disclosure. The exemplary embodiments described above include various levels of invention, and the various inventions are elicited through the combination of the multiple structural elements disclosed herein. Even if several structural elements are removed from among all of the structural elements illustrated in the exemplary embodiments, the configuration with the several structural elements removed therefrom may still be elicited as an invention insofar as an effect is obtained.

In the exemplary embodiments, the term "processor" refers to hardware in a broad sense. Examples of the processor include general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Also, in the exemplary embodiments, an image forming device, a music playback device, and a cleaning robot are applied as examples of the control target device, but the control target device is not limited to these and may also include devices such as a bath water heater, lighting equipment, a television, and an air conditioner, and configurations in which these devices are applied individually or in combinations of multiple devices are also possible.

Additionally, the exemplary embodiments describe a case where the information processing program 13A and the setting determination program 13B are preinstalled in the storage unit 13, but the configuration is not limited thereto. For example, an information processing program may also be provided stored on a storage medium such as Compact Disc-Read-Only Memory (CD-ROM), or may be provided over a network.

Furthermore, the exemplary embodiments describes a case in which the information processing and the setting determination process are achieved by a software configuration using a computer by executing a program, but the present disclosure is not limited thereto. For example, the information processing and the setting determination process may also be achieved by a hardware configuration, or by a combination of a hardware configuration and a software configuration.

Otherwise, the configurations of the information processing device 10 (see FIGS. 1, 2, 9, and 10) described in the exemplary embodiments are merely examples, and obviously, unnecessary portions may be removed or new portions may be added within a scope that does not depart from the gist of the present disclosure.

Also, the flow of the information processing (see FIG. 5) and the flow of the setting determination process (see FIGS. 6, 8, and 11) described in the exemplary embodiments are merely examples, and obviously, unnecessary steps may be removed, new steps may be added, or the processing sequence may be rearranged within a scope that does not depart from the gist of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing device comprising:
    a speech input and output (I/O) device, and
    a processor coupled to the speech I/O device and configured to
        receive, from the speech (I/O) device, as an utterance, an instruction for executing a printing service,
        cause the received printing service to be executed according to a setting comprising one of a printing resolution, a paper size, and a number of sheets which is determined using a state of the utterance comprising one of a pitch, a loudness, and a speed of speech in the utterance,
        determine the state of the utterance to determine which of a plurality of processes comprising a first process and a second process is to be executed for a function related to the printing service, wherein a first state corresponds to the first process and a second state corresponds to the second process, and
        when the setting is the loudness, the processor is further configured to cause the received service to be executed according to the first process in response to having determined that the utterance is in the first state and cause the received service to be executed according to the second process in response to having determined that the utterance is in the second state,
        wherein in response to the loudness of the utterance being larger than a threshold value, the utterance is determined as being in the first state, and in response to the loudness of the utterance being equal or smaller than the threshold value, the utterance is determined as being in the second state.

2. The information processing device according to claim 1, wherein the processor is further configured to
    cause the received service to be executed more times in response to louder speech in the utterance.

3. The information processing device according to claim 1, wherein the processor is further configured to
    cause the received service to be executed with a larger setting value in response to louder speech in the utterance.

4. The information processing device according to claim 1, wherein the processor is further configured to
    determine the setting using a past utterance.

5. The information processing device according to claim 4, wherein the processor is further configured to
    specify a speaker who gives the instruction, and
    determine the setting using the utterance received in the past from the speaker who gives the instruction.

6. The information processing device according to claim 5, wherein the processor is further configured to
    specify the speaker who gives the instruction by voice authentication when receiving the instruction for executing the service as an utterance, and
    determine the setting using the utterance received in the past from the speaker who gives the instruction.

7. The information processing device according to claim 1, wherein the processor is further configured to
    cause the service to be executed according to a setting determined using schedule information about a speaker who gives the instruction.

8. The information processing device according to claim 7, wherein
    in a case where the setting determined using the state of the utterance and the setting determined using the schedule information are different,
    the processor is further configured to
    additionally receive a selection of which setting to use.

9. The information processing device according to claim 7, wherein in a case where the setting determined using the state of the utterance and the setting determined using the schedule information are different,
the processor is further configured to
cause the service to be executed according to the setting determined using the schedule information.

10. The information processing device according to claim 7, wherein
the schedule information is schedule information related to the received service.

11. The information processing device according to claim 8, wherein
the schedule information is schedule information related to the received service.

12. The information processing device according to claim 9, wherein
the schedule information is schedule information related to the received service.

13. The information processing device according to claim 1, wherein the processor is further configured to
additionally cause the service and content of the determined setting to be presented.

14. The information processing device according to claim 13, wherein the processor is further configured to
additionally receive an utterance by a speaker who gives the instruction in response to the presentation of the service and the setting.

15. The information processing device according to claim 13, wherein the processor is further configured to
cause the service and the setting to be presented in a case where a volume of noise occurring together with the utterance is higher than a predetermined level.

16. The information processing device according to claim 14, wherein the processor is further configured to
cause the service and the setting to be presented in a case where a volume of noise occurring together with the utterance is higher than a predetermined level.

17. The information processing device according to claim 1, wherein the processor is further configured to cause an image forming device to execute the received service according to the setting determined using the state of the utterance.

18. A non-transitory computer readable medium storing a program causing a computer comprising a processor and a speech input and output (I/O) device to execute functions comprising:
receiving, from the speech (I/O) device, as an utterance, an instruction for executing a printing service;
causing the received printing service to be executed according to a setting comprising one of a printing resolution, a paper size, and a number of sheets which is determined using a state of the utterance comprising one of a pitch, a loudness, and a speed of speech in the utterance,
determine the state of the utterance to determine which of a plurality of processes comprising a first process and a second process is to be executed for a function related to the printing service, wherein a first state corresponds to the first process and a second state corresponds to the second process, and
when the setting is the loudness, the processor is further configured to cause the received service to be executed according to the first process in response to having determined that the utterance is in the first state and cause the received service to be executed according to the second process in response to having determined that the utterance is in the second state,
wherein in response to the loudness of the utterance being larger than a threshold value, the utterance is determined as being in the first state, and in response to the loudness of the utterance being equal or smaller than the threshold value, the utterance is determined as being in the second state.

* * * * *